Figure 1:
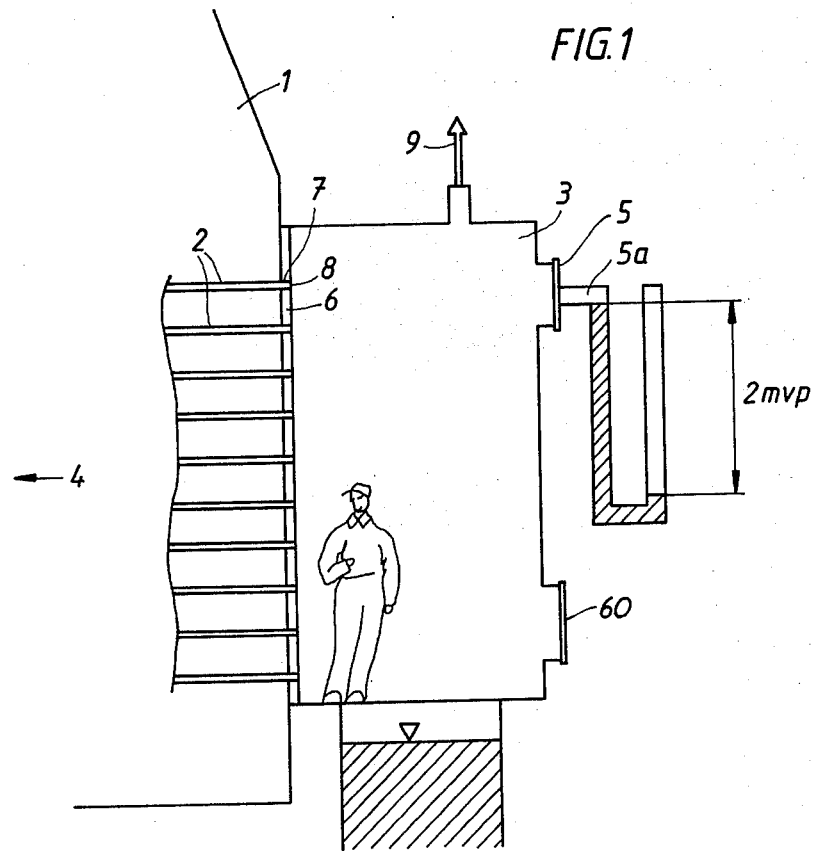

United States Patent [19]

Dahmén et al.

[11] Patent Number: 4,467,635

[45] Date of Patent: Aug. 28, 1984

[54] LEAK DETECTION IN HEAT EXCHANGER TUBES AND THEIR TUBE SHEET CONNECTIONS

[75] Inventors: Karl G. Dahmén; Roger Eriksson, Linköping, Sweden

[73] Assignee: Stal Laval Apparat AB, Linkoping, Sweden

[21] Appl. No.: 400,610

[22] Filed: Jul. 22, 1982

[30] Foreign Application Priority Data

Aug. 21, 1981 [SE] Sweden .............................. 8104959

[51] Int. Cl.³ .............................................. G01M 3/12
[52] U.S. Cl. ............................. 73/40.5 R; 137/247.41
[58] Field of Search .............................. 73/40.5 R, 46; 137/247.49, 247.51, 247.41, 247.43, 247.45, 247.47

[56] References Cited

U.S. PATENT DOCUMENTS

| | | | |
|---|---|---|---|
| 1,041,156 | 10/1912 | Payne | 73/40.5 R |
| 3,072,550 | 1/1963 | Fortescue et al. | 137/247.41 X |
| 3,134,515 | 5/1964 | Callahan, Jr. | 73/40.5 R |
| 3,699,802 | 10/1972 | Hotla et al. | 73/40.5 R |
| 3,871,398 | 3/1975 | Finger | 137/247.49 X |
| 3,950,983 | 4/1976 | Slinger | 73/46 |
| 4,051,715 | 10/1977 | Ledeen et al. | 73/40.5 R |
| 4,187,716 | 2/1980 | Simpson | 73/49.1 X |
| 4,216,821 | 8/1980 | Robin | 73/40.5 R X |
| 4,338,812 | 7/1982 | Lindgren | 73/40.5 R |

FOREIGN PATENT DOCUMENTS

| 20673 | of 1908 | United Kingdom | 73/40.5 R |
| 311908 | 5/1929 | United Kingdom | 73/40.5 R |

Primary Examiner—Gerald Goldberg
Assistant Examiner—Tom Noland
Attorney, Agent, or Firm—Kenyon & Kenyon

[57] ABSTRACT

To test a shutdown steam condenser for tube leakage, the pressure in the water boxes is reduced below atmospheric pressure while the steam casing is open to atmospheric pressure, and leakage of air into the boxes is used as an indication of the tube leakage. The leakage is preferably indicated with a soap bubble test by a workman inside the box. Although the entrance manholes to the water box are substantially sealed during testing, for safety protection one can be sealed with a U-tube water seal so that it will be broken automatically by an excessive underpressure.

4 Claims, 2 Drawing Figures

LEAK DETECTION IN HEAT EXCHANGER TUBES AND THEIR TUBE SHEET CONNECTIONS

One type of steam condenser comprises a bundle of horizontal tubes with their ends connected in tube sheets having outsides enclosed by water boxes with the tubes and insides of the tube sheets enclosed by a steam casing. Cold water is fed into one water box and flows through the tubes and into the other water box from which the water is discharged. Steam flows downwardly through the casing and exchanges its heat with the tubes with consequent steam condensation. There may be other types of heat exchangers which are the equivalent of this type and to which the following is applicable.

In large steam condensers the water boxes have one or more normally fluid-tightly closed, manholes through which a workman can enter when opened, and examine the tube ends and their connections with the tube sheets for possible leakage, the condenser being shut down for this purpose. Air at a pressure of from 0.2 to 0.3 barye higher than the ambient air is introduced to the steam casing with the boxes open to the ambient air, and using a soap solution the workman looks for air bubbles, in this way detecting possible leakage through the tubes or their tube end connections in the tube sheets. A leaky tube can be plugged and a leaky tube end connection in a tube sheet repaired.

To provide sufficient overpressure in the steam chamber it is necessary to seal off various pipes and other parts in the plant where the steam condenser is installed, which is an expensive operation. Other operations in the plant are disturbed so as to result in a longer shutdown time than is desirable.

In the case of large steam turbine condensers, it is particularly important to prevent the cooling water from leaking into the pure condensate water.

Briefly summarizing the present invention, the pressure differential required to practice the soap bubble detection is obtained by reducing the air pressure in the water boxes to from 0.1 to 0.2 barye below the ambient air pressure while giving the steam casing access to the ambient air pressure. For this it is only necessary to close the water box manholes after the workman has entered and vent the steam casing, leaving the condenser pipes and other parts of the plant undisturbed. A workman can work without substantial discomfort in this reduced air pressure, using the soap solution and soap bubble test, or possibly other testing practices, to detect leakage through the tubes and their end connections with the tube sheets. To exhaust the air from either one of the water boxes, a separate vacuum pump can be used if the condenser is not provided with an existing water box evacuating pump. An air flow through the water box in which the workman works can be maintained by allowing air to enter the box at a slower rate than it is exhausted, and for the workman's safety the water box can be provided with means for automatically connecting it with the ambient air in the event the air inflow is substantially reduced or stopped or the box pressure drops dangerously for any reason. Both boxes are interconnected by the tubes and air exhausted from one box drops the pressure in both boxes and the tubes.

Figure 2:
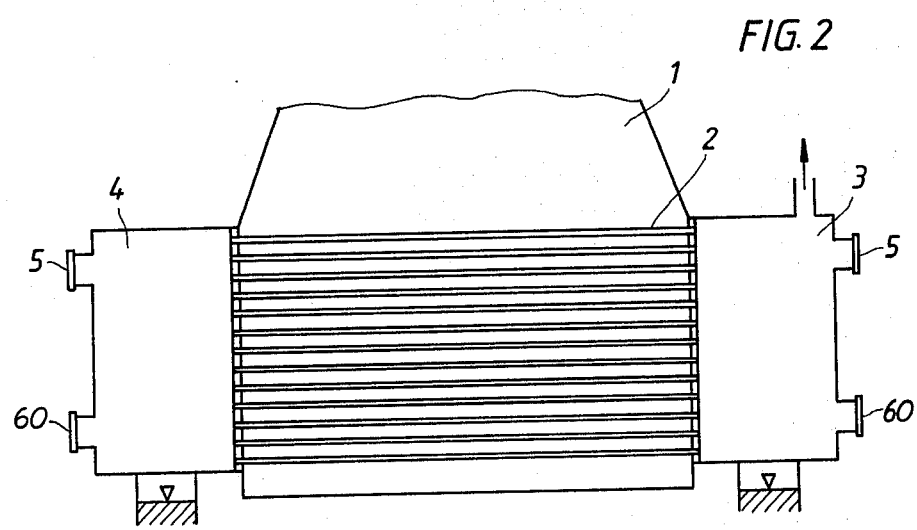

The invention is illustrated by the accompanying drawings in which:

FIG. 1 in vertical section schematically shows one side of a steam condenser and the ends of its tubes connected in the tube sheet of one of the water boxes; and FIG. 2 on smaller scale in vertical section schematically shows the steam condenser more completely.

Having reference to the above drawings, the steam casing 1 is shown with the bundle of horizontal tubes 2 having their ends opening into and interconnecting the water boxes 3 and 4. For the workman's safety one of the water box manholes 5 is provided with a U-bend tube 5a containing water so as to form a water seal, excessive underpressure in the water box 3 sucking the water into the water box 3 so as to open the tube 5a to the ambient air. For example, at a pressure of 0.2 barye under the ambient air pressure, the leg connected with the box should have a height of about 2 m and there should be enough water to fill that leg. The workman is not exposed to any risk. An appreciably lower pressure in the water box 3 would require the workman to be protected by a suitable garment.

In FIG. 1 in particular, one tube sheet 6 can be seen with the ends 7 of the tubes 2 connected in its tube holes. It is possible for leaks to occur in any one of the tubes 2 through its wall or via the interfaces 8 between the tube end and the tube sheet hole. By spraying a soap solution around each of the tube ends, or by any other suitable technique, such leakage can be detected by the workman. This new method has been successfully tested in large turbine condensers without requiring sealing of the various steam chamber pipe connections or other associated equipment. After the workman enters the water box, conveniently done via the lower one 60 of the manholes, sealing of the water box 3 is inherently free from difficulty. Shutting all manhole covers is enough. The manhole 60 need not be shut completely tightly so that by exhausting at an adequate rate the air from the water box, as indicated by the arrow 9, the lower pressure in the water box can be easily established with an adequate air flow for the workman. Complete safety is insured by the U-tube 5a containing the water column, and which automatically opens the inside of the box to the ambient air on the outside of the box in the event the air inflow is substantially reduced or stops, and with continuing air outflow the air pressure drops below 0.2 barye under the normal atmospheric air pressure. The workman can comfortably apply the soap bubble test or other leak detection techniques without danger or discomfort.

We claim:

1. A method for detecting leaks in a shutdown steam condenser and the like having a bundle of tubes with their ends connected in tube sheets having outsides enclosed by water boxes and the tubes and insides of the tube sheets enclosed by a steam casing; said method comprising giving the casing access to the ambient air, reducing the air pressure in the water boxes to below that of the ambient air, and from within at least one of the water boxes examining the tube ends and their connections in the tube sheet for leakage of the air from the casing into the water boxes, the examining being effected by applying to the tube ends and their connections in the tube sheet a fluid that forms air bubbles in the event the air in the casing leaks through either the tubes or their connections in the tube sheet and thereby into that one of the water boxes.

2. The method of claim 1 in which for said examining a workman is present in said one of the water boxes and that water box is provided with an inflow of air and an outflow of air, the outflow being at a higher rate than the inflow so as to maintain the water box at the reduced air pressure.

3. The method of claim 2 in which said one of the water boxes is provided with means for automatically connecting it with the ambient air in the event said inflow is substantially reduced or stops.

4. The method of claim 3 in which said means comprises a U-bend tube water-seal having one leg connected into said one of the water boxes and the other leg open to the ambient air, the water-seal containing a water column adapted to be sucked into the water box in the event said reduced pressure becomes substantially less than about 0.2 barye below that of the ambient air.

* * * * *